United States Patent
Hapsari et al.

(10) Patent No.: US 10,959,104 B2
(45) Date of Patent: Mar. 23, 2021

(54) MEASUREMENT CONTROL METHOD AND BASE STATION

(71) Applicant: NTT DOCOMO, INC., Tokyo (JP)

(72) Inventors: Wuri Andarmawanti Hapsari, Tokyo (JP); Tooru Uchino, Tokyo (JP); Hideaki Takahashi, Tokyo (JP)

(73) Assignee: NTT DOCOMO, INC., Tokyo (JP)

(*) Notice: Subject to any disclaimer, the term of this patent is extended or adjusted under 35 U.S.C. 154(b) by 0 days.

(21) Appl. No.: 15/301,835

(22) PCT Filed: Apr. 8, 2015

(86) PCT No.: PCT/JP2015/060999
§ 371 (c)(1),
(2) Date: Oct. 4, 2016

(87) PCT Pub. No.: WO2015/156324
PCT Pub. Date: Oct. 15, 2015

(65) Prior Publication Data
US 2017/0034709 A1    Feb. 2, 2017

(30) Foreign Application Priority Data
Apr. 9, 2014 (JP) .............................. JP2014-080585

(51) Int. Cl.
*H04W 24/10* (2009.01)
*H04W 76/10* (2018.01)
(Continued)

(52) U.S. Cl.
CPC ........... *H04W 16/14* (2013.01); *H04W 24/00* (2013.01); *H04W 24/10* (2013.01);
(Continued)

(58) Field of Classification Search
CPC ......... H04W 72/0453; H04W 36/0088; H04W 16/32; H04L 67/34
(Continued)

(56) References Cited

U.S. PATENT DOCUMENTS

2010/0234015 A1* 9/2010 Iwamura ............... H04W 24/10
455/423
2010/0241317 A1* 9/2010 Mihara ............... B60R 21/0132
701/46

(Continued)

FOREIGN PATENT DOCUMENTS

CN           103139911 A         6/2013

OTHER PUBLICATIONS

NEC Corporation, "Other Inter-node RRC messages for DC," 3GPP TSG RAN2 Meeting #85b; R2-141283; Valencia, Spain; Mar. 31-Apr. 4, 2014 (7 pages).

(Continued)

*Primary Examiner* — Asad M Nawaz
*Assistant Examiner* — Jason A Harley
(74) *Attorney, Agent, or Firm* — Osha Bergman Watanabe & Burton LLP (57) ABSTRACT

A measurement control method in a mobile communication system is provided. The mobile communication system includes a first base station and a second base station which perform communications with a user apparatus by using inter-base-station carrier aggregation. The measurement control method includes a measurement instruction step of determining, by the second base station, a parameter used for measurement configuration information for the user apparatus and transmitting measurement instruction information including the parameters to the first base station; and a measurement configuration information providing step of generating, by the first base station which has received the
(Continued)

measurement instruction information, the measurement configuration information in which the parameter included in the measurement instruction information is set, and transmitting the measurement configuration information to the user apparatus.

13 Claims, 8 Drawing Sheets (51) Int. Cl.
*H04W 36/30* (2009.01)
*H04W 36/00* (2009.01)
*H04J 1/16* (2006.01)
*H04W 16/14* (2009.01)
*H04W 24/00* (2009.01)
*H04W 28/08* (2009.01)
*H04W 92/20* (2009.01)
*H04W 72/08* (2009.01)
*H04W 88/06* (2009.01)

(52) U.S. Cl.
CPC ........ *H04W 28/085* (2013.01); *H04W 72/085* (2013.01); *H04W 88/06* (2013.01); *H04W 92/20* (2013.01)

(58) Field of Classification Search
USPC .......................................... 370/331
See application file for complete search history.

(56) References Cited

U.S. PATENT DOCUMENTS

| 2012/0201173 | A1* | 8/2012 | Jain | H04B 1/525 370/277 |
| 2013/0022026 | A1* | 1/2013 | Ishii | H04L 5/001 370/332 |
| 2013/0028117 | A1* | 1/2013 | Montojo | H04L 5/001 370/252 |
| 2013/0051214 | A1* | 2/2013 | Fong | H04W 76/19 370/216 |
| 2013/0300372 | A1* | 11/2013 | Brunhuber | H01M 8/186 320/128 |
| 2013/0322372 | A1* | 12/2013 | Kim | H04W 16/14 370/329 |
| 2014/0092865 | A1* | 4/2014 | Heo | H04W 28/0221 370/331 |
| 2014/0241317 | A1* | 8/2014 | Jamadagni | H04W 40/36 370/331 |
| 2014/0269575 | A1 | 9/2014 | Zhang et al. | |
| 2015/0230236 | A1* | 8/2015 | Zeng | H04L 41/0806 370/329 |
| 2015/0241317 | A1* | 8/2015 | Miyoshi | G01M 99/008 427/8 |
| 2015/0244489 | A1* | 8/2015 | Wang | H04J 11/0056 370/329 |

OTHER PUBLICATIONS

NSN, Nokia Corporation, "RRM measurements for Dual Connectivity," 3GPP TSG-RAN WG2 Meeting #85; R2-140374; Prague, Czech Republic; Feb. 10-14, 2014 (6 pages).

3GPP TS 36.331 V12.1.0, "3rd Generation Partnership Project; Technical Specification Group Radio Access Network; Evolved Universal Terrestrial Radio Access (E-UTRA); Radio Resource Control (RRC); Protocol specification (Release 12);" Mar. 2014 (356 pages).

3GPP TR 36.842 V12.0.0; "3rd Generation Partnership Project; Technical Specification Group Radio Access Network; Study on Small Cell enhancements for E-UTRA and E-UTRAN; Higher layer aspects (Release 12)," Dec. 2013 (71 pages).

International Search Report issued in PCT/JP2015/060999, dated Jun. 30, 2015 (4 pages).

Written Opinion of the International Search Authority issued in PCT/JP2015/060999, dated Jun. 30, 2015 (4 pages).

Office Action issued in the counterpart Chinese Patent Application No. 201580016819.X, dated Feb. 22, 2019 (14 pages).

* cited by examiner

MEASUREMENT CONTROL METHOD AND BASE STATION

BACKGROUND OF THE INVENTION

1. Field of the Invention

The present invention relates to a technique for providing measurement configuration information for a user apparatus UE in a mobile communication system.

2. Description of the Related Art

Figure 1:
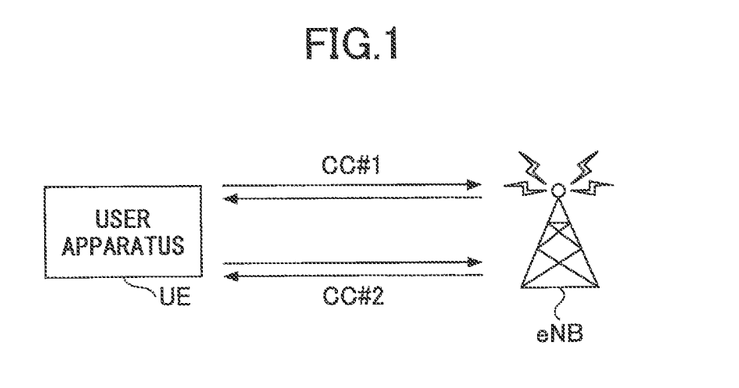
FIG. 1 is a drawing illustrating CA up to Rel-10.

In an LTE system, carrier aggregation (hereinafter, referred to as CA) has been introduced. CA enables communications by using a plurality of component carriers (hereinafter, referred to as CC) at the same time. As illustrated in FIG. 1, in CA up to LTE Rel-10, it is possible to realize high throughput by performing simultaneous communications by using multiple CCs under the same base station eNB.

On the other hand, in LTE Rel-12, the above operation is further enhanced and dual connectivity (DC) is proposed in which simultaneous communications are performed to realize high throughput by using CCs under different base stations eNBs (Non Patent Document 1). In other words, in dual connectivity, a UE performs communications by simultaneously using radio resources of two physically different base stations eNBs.

Figure 2:
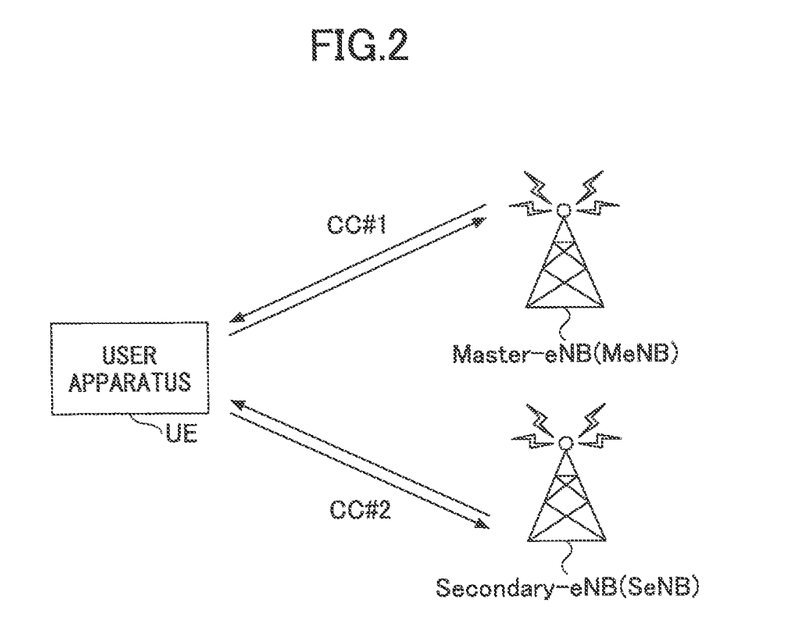
FIG. 2 is a drawing illustrating an example of dual connectivity.

Dual connectivity is a kind of CA, and is also referred to as Inter eNB CA (inter-base-station carrier aggregation). In DC, a master-eNB (MeNB) and a secondary-eNB (SeNB) are introduced. An example of dual connectivity is illustrated in FIG. 2. In an example of FIG. 2, a MeNB communicates with the user apparatus UE via CC #1, a SeNB communicates with the user apparatus UE via CC #2, and thus, dual connectivity is realized.

In dual connectivity, (one or multiple) cells under the MeNB are referred to as a master cell group (MCG), and (one or multiple) cells under the SeNB are referred to as a secondary cell group (SCG).

CITATION LIST

Non-Patent Literature

[NPL 1]
3GPP TR 36.842 V12.0.0 (2013-12)
[NPL 2]
3GPP TR 36.331 V12.1.0 (2014-03)

SUMMARY OF THE INVENTION

Technical Problem

In the case where CA is applied, measurement control is performed from view points of a mobility related handover, CC addition, and CC removal. In the measurement control, a user apparatus UE measures, for each CC, an RSRP and an RSRQ (collectively referred to as reception quality) of a serving cell and a neighbor cell, and in the case where a specific condition (event) is satisfied, it is possible for the UE to transmit a report to a base station eNB.

In dual connectivity, cell configuration control operations can be considered including SeNB (SCG) addition (SCG addition), SeNB (SCG) change (SCG change), SCell addition to SCG, and SCell removal from SCG. Here, SCG addition means that an SCG cell is added for the first time in a state where a cell is formed only by an MeNB. The SCG cell which is added for the first time is referred to as a primary SCell (PSCell). It should be noted that at the time of SCG addition, a configuration for off-loading a bearer (data) from the MeNB to the SeNB is also provided.

In conventional CA which is not dual connectivity, for example, in the case of adding an SCell, it is possible for the base station eNB to set a cell as the SCell by detecting, by the user apparatus UE, the neighbor cell whose reception quality is better than a predetermined threshold according to a specific event, and transmitting the detection report to the base station eNB.

Regarding the event, various types of events are defined (NPL 2). However, regarding the conventional events, basically it is only defined that various types of parameters (an offset, a threshold value, etc.,) for serving cells (PCell and SCell in the case of CA) of a base station eNB are used for the events.

However, in dual connectivity, cell configuration controls including MCG cell addition/removal/change and SCG cell addition/removal/change are performed by multiple different base stations. Therefore, in the case where measurement configuration information is provided by using conventional events which assume a single base station, there is a possibility, for example, that cell addition/removal, etc., cannot be performed appropriately in SCG. For example, regarding a threshold value/offset of an event, it is preferable that a threshold value/offset related to SeNB (SCG) can be set separately from a threshold value/offset related to MeNB (MCG). However, this kind of setting cannot be provided by the conventional technique.

The present invention has been made in view of the above, and an object of the present invention is to provide a technique which is capable of providing measurement configuration information for a user apparatus appropriately in a mobile communication system which includes a first base station and a second base station which perform communications with the user apparatus by using inter-base-station carrier aggregation.

Solution to Problem

According to an embodiment, a measurement control method is provided in a mobile communication system which includes a first base station and a second base station which perform communications with a user apparatus by using inter-base-station carrier aggregation. The measurement control method includes: a measurement instruction step of, by the second base station, determining a parameter used for measurement configuration information for the user apparatus and transmitting measurement instruction information including the parameter to the first base station; and a measurement configuration information providing step of, by the first base station that has received the measurement instruction information, generating the measurement configuration information in which the parameter included in the measurement instruction information is set and transmitting the measurement configuration information to the user apparatus.

Further, according to an embodiment, a measurement control method is provided in a mobile communication system which includes a first base station and a second base station which perform communications with a user apparatus by using inter-base-station carrier aggregation. The measurement control method includes: a parameter determination step of, by the first base station, determining a parameter for radio measurement related to a cell under the second base station or a neighbor cell; and a measurement configuration information providing step of, by the first base station, generating measurement configuration information in which the parameter is set and transmitting the measurement configuration information to the user apparatus.

Further, according to an embodiment, a base station corresponding to a first base station is provided in a mobile communication system including the first base station and a second base station which base stations communicate with a user apparatus by using inter-base-station carrier aggregation. The base station includes: a unit configured to receive from the second base station measurement instruction information which includes a parameter used for measurement configuration information for the user apparatus; and a unit configured to generate the measurement configuration information in which the parameter included in the measurement instruction information is set, and transmit the generated measurement configuration information to the user apparatus.

Further, according to an embodiment, a base station corresponding to a first base station is provided in a mobile communication system including the first base station and a second base station which base stations communicate with a user apparatus by using inter-base-station carrier aggregation. The base station includes: a unit configured to determine a parameter for radio measurement related to a cell under the second base station or a neighbor cell; and a unit configured to generate measurement configuration information in which the parameter is set, and transmit the generated measurement configuration information to the user apparatus.

Advantageous Effects of Invention

According to an embodiment, in a mobile communication system including a first base station and a second base station which base stations communicate with a user apparatus by using inter-base-station carrier aggregation, it is possible to provide appropriately measurement configuration information for the user apparatus.

DETAILED DESCRIPTION OF THE PREFERRED EMBODIMENTS

In the following, referring to the drawings, embodiments of the present invention will be described. It should be noted that the embodiments described below are merely examples and the embodiments to which the present invention is applied are not limited to the following embodiments. Further, in an embodiment, a target is an LTE mobile communication system. However, an embodiment is not limited to LTE, and can be applied to other mobile communication systems. Further, in the present application specification and claims, unless otherwise specified, the term "LTE" is used as the meaning defined in 3GPP Rel-12, or later.

(Overall System Configuration and an Overview of an Embodiment)

Figure 3:
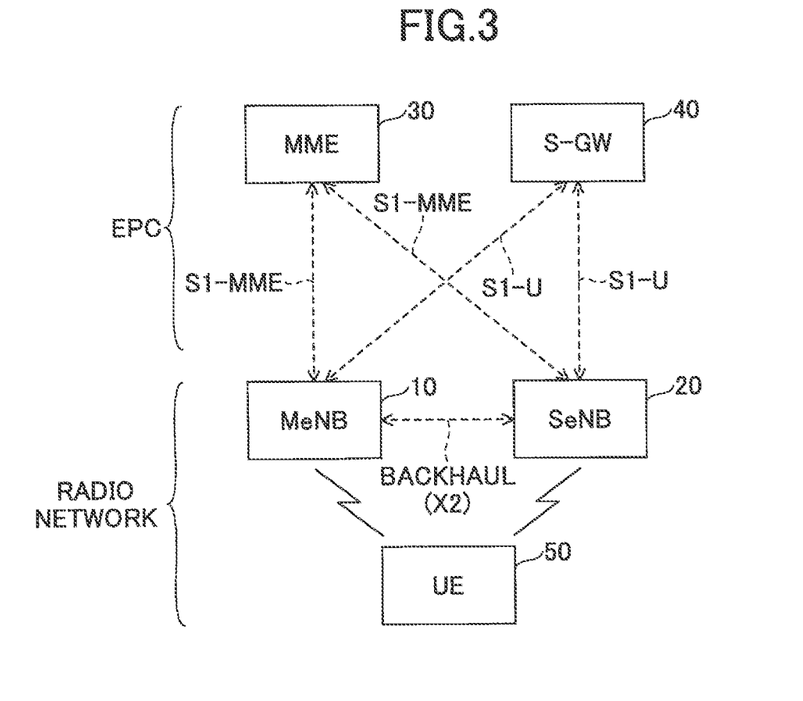
FIG. 3 is a drawing illustrating a structure diagram of a communication system according to an embodiment of the present invention.

FIG. 3 illustrates an overall configuration diagram of a mobile communication system according to an embodiment of the present invention. As illustrated in FIG. 3, a mobile communication system according to an embodiment includes MME 30 and S-GW 40 which constitute an evolved packet core (EPC) of LTE, and MeNB 10 and SeNB 20 which constitute a radio network. Further, it is possible for a UE 50 to perform dual connectivity communications (inter-base-station carrier aggregation) by communicating with the MeNB 10 and the SeNB 20.

It is possible to connect between an MME 30 and each of the eNBs by S1-MME interface. It should be noted that only the MeNB 10 may be connected to the MME 30 by S1-MME interface and the SeNB 20 may not be connected to the MME 30 by S1-MME interface. It is possible to connect between an S-GW 40 and each of the eNBs by S1-U interface.

The MME 30 is a node apparatus which accommodates eNBs and performs UE mobility management, authentication, bearer management set for UEs, etc. The S-GW 40 is a serving packet gateway apparatus which performs user data transmission, and performs relaying user data between each of the eNBs and an external apparatus.

The MeNB 10 and the SeNB 20 are base stations which are a master eNB and a secondary eNB, respectively, in dual connectivity. It should be noted that the number of the SeNBs 20 may be plural. The UE 50 is a user apparatus which a user has, and is a mobile telephone, a smartphone, etc.

Figure 4:
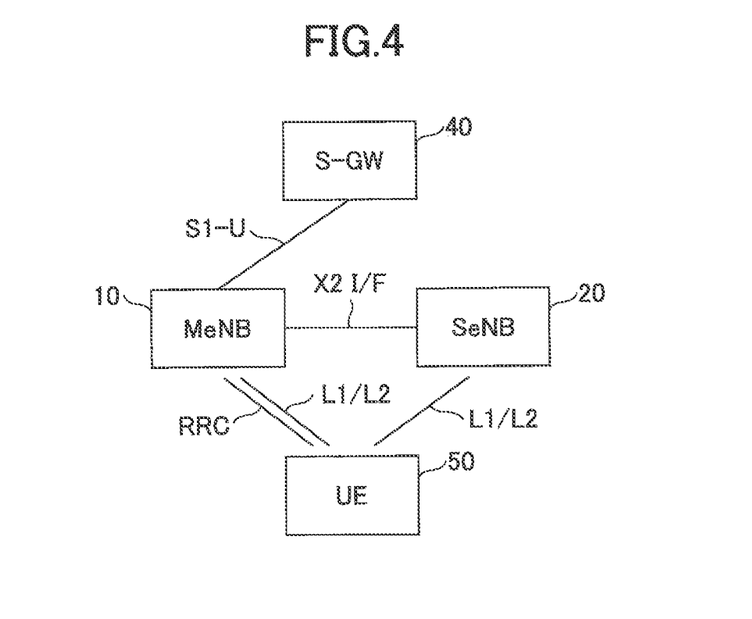
FIG. 4 is a drawing illustrating a connection structure example 1 of a communication system according to an embodiment of the present invention.
Figure 5:
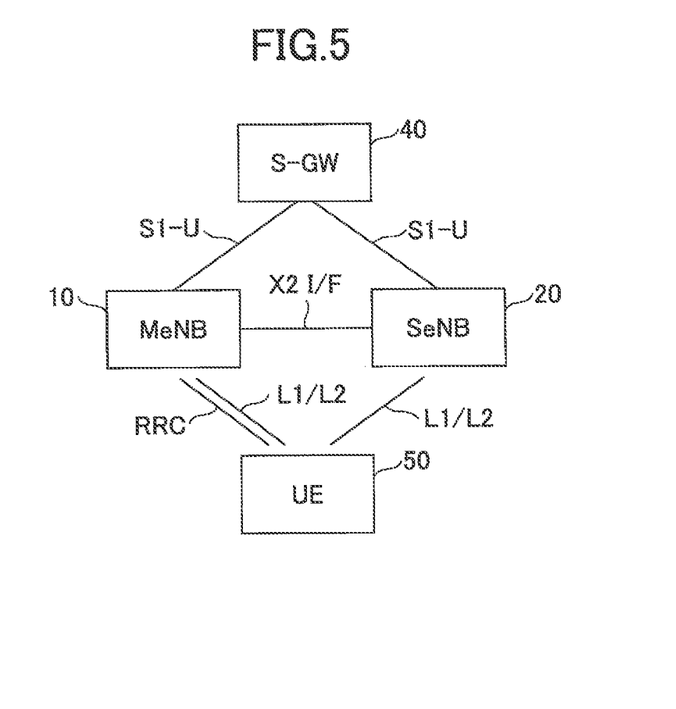
FIG. 5 is a drawing illustrating a connection structure example 2 of a communication system according to an embodiment of the present invention.

As illustrated in FIG. 4 (connection structure example 1), the S-GW 40 may be connected to only the MeNB 10, or, as illustrated in FIG. 5 (connection configuration example 2), the S-GW 40 may be connected to the MeNB 10 and the SeNB 20. In the case of FIG. 4, data for the UE 50 is transmitted from the S-GW 40 to the MeNB 10, the data is partially transmitted to the UE 50, remaining data is transmitted to the SeNB 20, and then transmitted to the UE 50. In the case of FIG. 5, data for the UE 50 is partially transmitted to the UE 50 via the S-GW 40 and the MeNB 10, and the remaining data is transmitted to the UE 50 via the S-GW 40 and the SeNB 20.

For example, as illustrated in FIG. 4 and FIG. 5, in dual connectivity, RRC protocol is terminated between the UE 50 and the MeNB. Therefore, an RRC message, which has a function for transmitting measurement configuration information (information for measurement configuration), can be transmitted only from the MeNB 10. In other words, an RRC message cannot be transmitted from the SeNB 20.

(Regarding Measurement Configuration)

The UE 50 measures downlink reception quality of a cell, and, according to, for example, a specific event, transmits the measurement result to a base station (e.g., the MeNB 10 in an embodiment). As a result, it is possible for the MeNB 10 to perform cell addition, removal, change, etc. Configuration (measurement configuration) related to what (RSRP, RSRQ, etc.,) should be measured in which frequency, what kind of information should be included in a result report, and which condition (event) should trigger the result reporting, is provided for the UE 50 by having an RRC message which includes measurement configuration information (e.g.: RRCConnectionReconfiguration message) transmitted to the UE 50.

Here, in order to describe an embodiment, basics in measurement configuration will be described (refer to NPL 2).

The measurement configuration information which is transmitted from the base station to the UE by an RRC message includes a measurement object, reporting configuration information, and a measurement identity (measurement ID).

The measurement object includes targets to be measured including a measurement target frequency (EARFCN), a measurement bandwidth, etc. Regarding the frequency, a measurement object includes only one frequency.

The reporting configuration information includes a reporting trigger (based on an event, periodical, etc.,) a measurement/reporting quantity (RSRP, RSRQ, etc.), etc.

Figure 6:
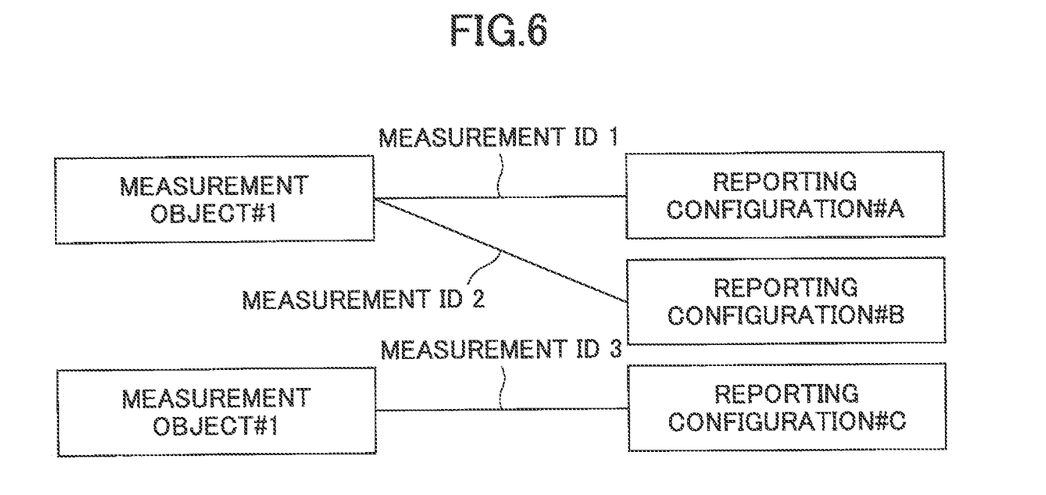
FIG. 6 is a drawing illustrating measurement configuration information.

The measurement ID links a measurement object with a reporting configuration information item. Examples of measurement ID links are illustrated in FIG. 6. As illustrated in FIG. 6, it is possible to link a measurement object (e.g., a frequency) with multiple reporting configuration information items (e.g., in the case where different events are set), and to identify reporting configuration information items by using corresponding measurement IDs.

Further, measurement report triggering events include, an event A1, an event A2, an event A3, an event A4, an event A5, an event A6, etc., as Intra EUTRA events, and, an event B1, an event B2, etc., as Inter RAT events. Existing events are described in, for example, NPL 2.

An example of an event use case will be described by taking as examples handover, SCell addition/removal in CA in Rel-10.

When a CA-performing UE performs handover (i.e., changes a PCell), the event A3, for example, is used. The event A3 is used for transmitting a report (measurement report) in the case where reception quality (RSRP and/or RSRQ) of a neighbor cell becomes better than the reception quality of the PCell by more than offset amount. It should be noted that a frequency, an offset, etc., of a measurement target neighbor cell are specified in the measurement object. Further, in a measurement report, for example, a measurement ID, a cell ID of the neighbor cell, reception quality of the neighbor cell, etc., are included. The base station, which has received the measurement report, stores information of the neighbor cell as a handover target cell (switching destination PCell).

Further, for example, the event A4 is used for adding an SCell. The event A4 is used for transmitting a report in the case where reception quality of a neighbor cell becomes better than a predetermined threshold value. The neighbor cell is a cell other than the cells configured as a PCell or an SCell, and a frequency of the neighbor cell is, for example, specified in the measurement object. Further, the predetermined threshold value is specified in the reporting configuration information. The measurement report based on the event A4 includes, for example, an ID and reception quality of the neighbor cell which has triggered the event, and a measurement ID. The base station, which has received the measurement report, can add the neighbor cell as an SCell.

For example, the event A2 is used for removing an SCell. The event A2 is used for transmitting a report in the case where the reception quality of the serving cell (including a PCell and an SCell set in the CA configuration) becomes worse than a predetermined threshold value. A frequency of the serving cell is specified by the measurement object. Further, the predetermined threshold value is specified in the reporting configuration information. The measurement report based on the event A2 includes, for example, an ID and reception quality of the serving cell which has triggered the event, and a measurement ID. The base station, which has received the measurement report, can remove the serving cell (assumed to be an SCell).

Further, for example, the event A6 is used for changing an SCell. The event A6 is used for transmitting a report in the case where reception quality of a neighbor cell with the same frequency as the SCell becomes better than the reception quality of the SCell by more than predetermined offset amount.

A frequency of the neighbor cell is specified by the measurement object. Further, the predetermined offset is specified by, for example, the measurement object. The measurement report based on the event A6 includes, for example, an ID and reception quality of the neighbor cell which has triggered the event, and a measurement ID. The base station, which has received the measurement report, can change a cell of the SCell to the neighbor cell.

(Process Flow in an Embodiment of the Present Invention)

As described above, parameters of an offset, a threshold value, etc., of an event related to an existing measurement control are based on an assumption of a single base station CA, and are not based on an assumption of a mobile communication system of dual connectivity which uses a MeNB 10 and a SeNB 20. Therefore, there is a possibility of a problem in that an appropriate control may not be performed especially for cell addition/removal in an SCG. The problem is solved in an embodiment by performing the following processes.

In other words, in an embodiment, the SeNB 20 determines parameters including a threshold value, etc., related to an SCG, and transmits the parameters from the SeNB 20 to the MeNB 10 by using X2 interface. Further, the MeNB 10 provides for a UE 50 measurement configuration information of an event in which the determined parameters are set by using an RRC message. The above processes are performed because the RRC message can be transmitted only from the MeNB 10.

Figure 7:
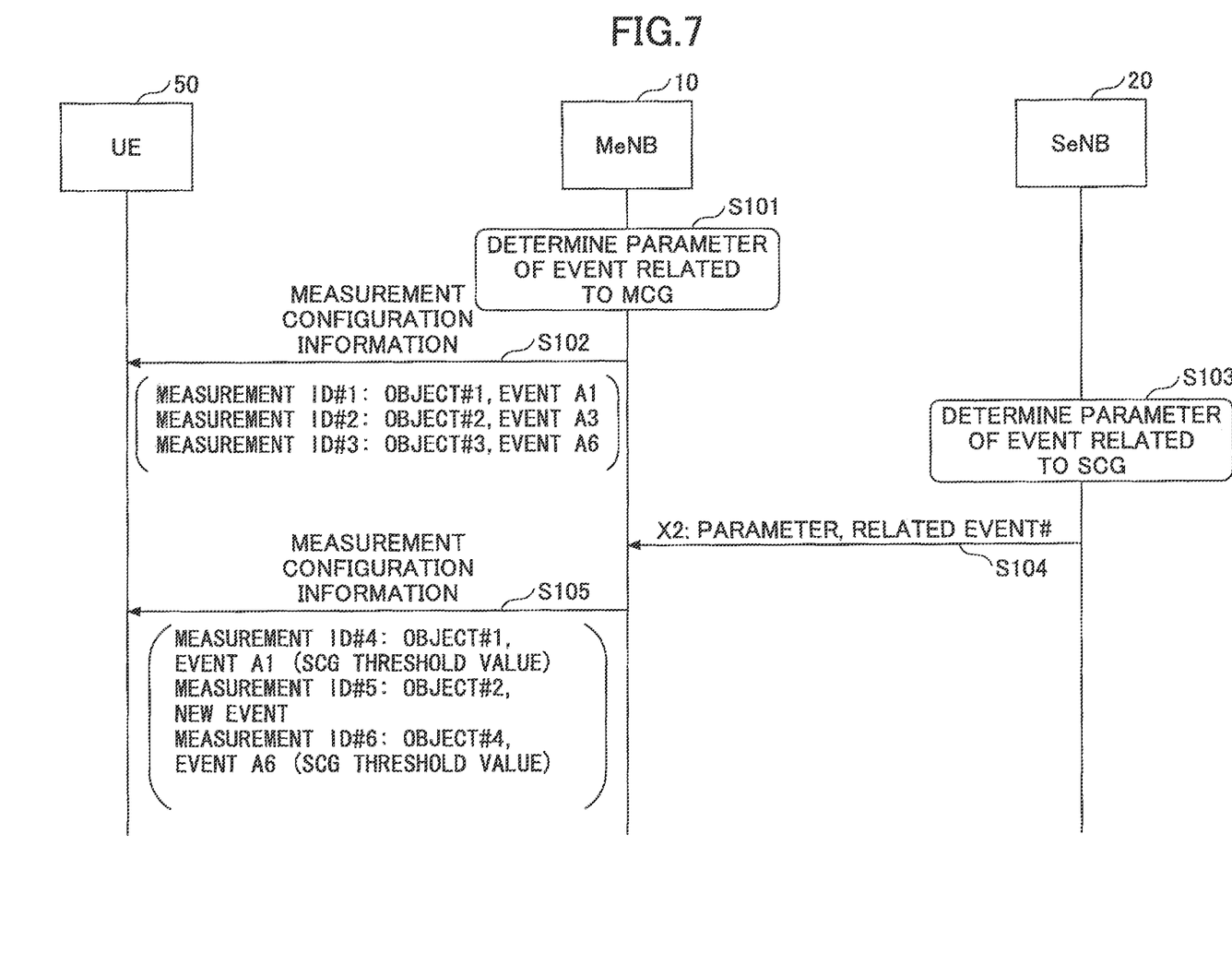
FIG. 7 is a drawing illustrating a processing sequence example of a communication system.

Referring to FIG. 7, a processing sequence example according to an embodiment will be described. In an embodiment, an MeNB 10 determines parameters related to an MCG (e.g., a threshold value, an offset, etc., related to MCG cells) (step S101). Further, the MeNB 10 provides measurement configuration information by transmitting to the UE 50 the measurement configuration information (RRC message) in which the parameters and corresponding events, etc., are set (step S102). In an example of FIG. 7, measurement configuration information items identified by a measurement ID #1, a measurement ID #2, and a measurement ID #3 are transmitted to the UE 50.

On the other hand, in step S103, an SeNB 20 determines parameters related to an SCG (e.g., a threshold value, an offset, etc., of SCG cells), and transmits the parameters and events, etc., corresponding to the parameters to the MeNB 10 (step S104). Information transmitted from the SeNB 20 to the MeNB 10 is necessary for the MeNB 10 to provide measurement configuration information related to the SCG for the UE 50.

The MeNB 10, which has received the information transmitted from the SeNB 20 in step S104, provides the measurement configuration information by transmitting to the UE 50 the measurement configuration information (RRC message) in which the received information is set. In an example of FIG. 7, measurement configuration information items identified by a measurement ID #4, a measurement ID #5, and a measurement ID #6 are transmitted to the UE 50. In this example, events in the measurement configuration information items of the measurement ID #4 and the measurement ID #6 have the same meaning as the existing events. However, parameters to be used (threshold values, offsets, etc.,) are related to the SCG and determined by the SeNB 20, and in this regard, different from existing events. These threshold values, offsets, etc., can be set differently from the threshold values, offsets, etc., of the same events of a normal CA. Further, the measurement configuration information item of the measurement ID #5 includes a new event different from the existing events.

In the above step S101 and step S103, it is possible for the MeNB 10 and the SeNB 20 to determine the parameters based on load information in cells (PCell, PSCell, SCell, etc.,) under the MeNB 10 and the SeNB 20, respectively. The load information includes a physical resource block (PRB) usage, interference amount of channels (e.g., CCs, sub carriers, PRBs), etc. It is possible for eNBs to obtain the load information from UE resource allocation information, strength of a signal received from a neighbor cell, quality information from UEs, etc. It should be noted that the load information is just an example. The parameters may be determined by using information other than load information.

As an example, in the case where an interference amount of an SCell under an MeNB 10/SeNB 20 is greater (e.g., greater than a threshold value), the MeNB 10/SeNB 20 sets a smaller offset in the event A6 related to the SCell than the case where the interference amount is not great. In other words, it is possible to realize a control method in which, in the case where the interference amount for the currently using SCell is greater, the SCell is changed even in the case where reception quality of a neighbor cell is only slightly higher than the reception quality of the SCell.

It should be noted that the order of the measurement configuration information related to the MCG and the measurement configuration information related to the SCG as described above is only an example, and the order may be opposite. Further, it may be assumed that related event information is not included in the information transmitted from the SeNB 20 to the MeNB 10. In this case, for example, the MeNB 10 determines the related events from the parameters.

In the following, an example of an SCG related event according to an embodiment will be described. The following example can be applied to an MCG related event as is. It is only necessary to set parameters including a threshold value, an offset, etc., to be used for the MCG. Further, existing events and parameters may be used for the MCG related events. Further, in the following, a threshold value and an offset are illustrated as examples of the parameters. It is possible to determine parameters other than the threshold value and the offset to be used for the SCG and provide a configuration in the same way. Further, an event described below is only an example. It is possible to determine another event for the SCG (or for the MCG) and provide a configuration in the same way.

(Example of Using an Existing Event)

First, an example will be described in which the meaning of an event is the same as the existing event and parameters such as a threshold value are set to be used for the SCG.

<Event A1: Serving Becomes Better than Threshold-scg>

The event A1 is used for transmitting a report in the case where the reception quality of the serving cells (including a PCell and an SCell of CA set in the MCG and the SCG, respectively) becomes better than a predetermined threshold value. In an embodiment, the threshold value is determined by the SeNB 20, and transmitted to the MeNB 10 as a threshold value for the event A1 (threshold-scg). The MeNB 10 transmits to the UE 50 measurement configuration information including the threshold value, a measurement target frequency, and an event A1 as a trigger type. The measurement target frequency may be determined by the MeNB 10, or may be transmitted from the SeNB 20 to the MeNB 10 as a parameter together with the threshold value.

Figure 8:
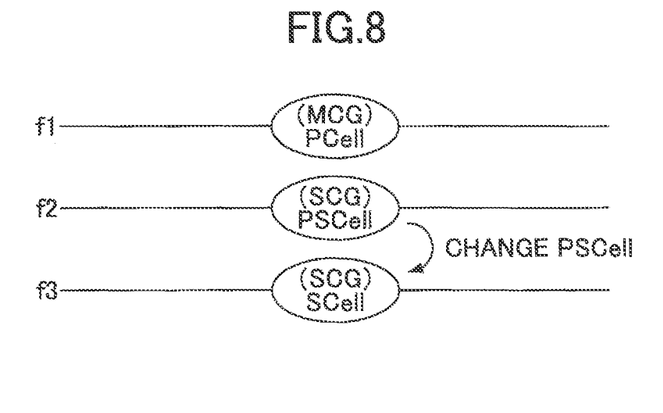
FIG. 8 is a drawing illustrating an event A1 according to an embodiment.

Referring to FIG. 8, an application example of the event A1 will be described. It should be noted that "cells" in FIG. 8 through FIG. 12 can be considered the same as CCs which constitute uplink and downlink for TDD, and the same as CCs which constitute downlink for FDD.

As illustrated in FIG. 8, it is assumed that CCs of frequency f1 constitute a PCell of the MCG, CCs of frequency f2 constitute a PSCell of the SCG (a first cell formed in the SCG), CCs of frequency f3 constitute an SCell of the SCC (a cell other than the PSCell in the SCG), and dual connectivity is performed.

The UE 50, which has received measurement configuration information of an event A1 (in which frequency f3 is specified in a measurement object), reports information of a cell, SCell to the MeNB 10 because reception quality of the SCell (SCG) of frequency f3 has become better than the threshold. The MeNB 10 determines to change the PSCell to be constituted by CCs of frequency f3, and performs a change process including transmitting an instruction to the SeNB 20, etc.

<Event A2: Serving Becomes Worse than Threshold-scg>

The event A2 is used for transmitting a report in the case where the reception quality of the serving cells (including a PCell and an SCell of CA set in the MCG and the SCG, respectively) becomes worse than a predetermined threshold value. In an embodiment, the threshold value is determined by the SeNB 20, and transmitted to the MeNB 10 as a threshold value for the event A2 (threshold-scg). The MeNB 10 transmits to the UE 50 measurement configuration information including the threshold value, a measurement target frequency, and an event A2 as a trigger type. The measurement target frequency may be determined by the MeNB 10, or may be transmitted from the SeNB 20 to the MeNB 10 as a parameter together with the threshold value.

Figure 9:
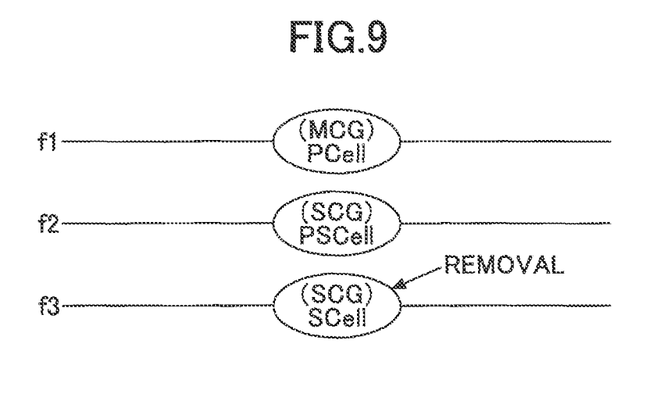
FIG. 9 is a drawing illustrating an event A2 according to an embodiment.

Referring to FIG. 9, an application example of the event A2 will be described. The UE 50, which has received measurement configuration information of an event A2 (in which frequency f3 is specified in a measurement object), reports information of a cell, SCell to the MeNB 10 because reception quality of the SCell (SCG) of frequency f3 has become worse than the threshold. The MeNB 10 determines to remove the SCell, and performs a removal process including transmitting an instruction to the SeNB 20, etc.

<Event A4: Neighbor Becomes Better than Threshold-scg>

The event A4 is used for transmitting a report in the case where reception quality of a neighbor cell becomes better than a predetermined threshold value. In an embodiment, the threshold value is determined by the SeNB 20, and transmitted to the MeNB 10 as a threshold value for the event A4 (threshold-scg). The MeNB 10 transmits to the UE 50 measurement configuration information including the threshold value, a measurement target frequency, and an event A4 as a trigger type. The measurement target frequency may be determined by the MeNB 10, or may be transmitted from the SeNB 20 to the MeNB 10 as a parameter together with the threshold value.

Figure 10:
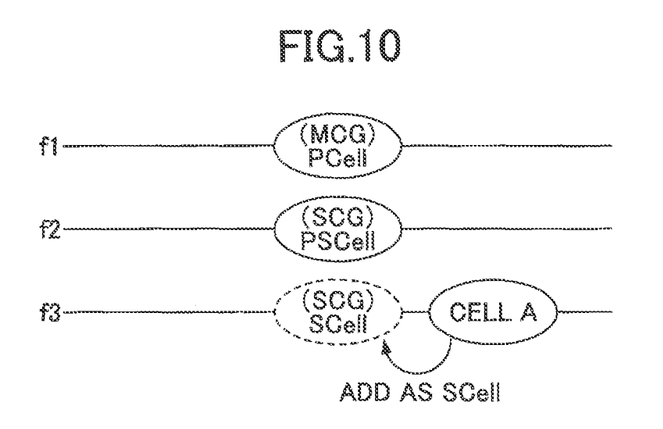
FIG. 10 is a drawing illustrating an event A4 according to an embodiment.

Referring to FIG. 10, an application example of the event A4 will be described. As illustrated in FIG. 10, CCs of frequency f1 constitute a PCell of an MCG, CCs of frequency f2 constitute a PSCell of an SCG, and dual connectivity is performed. Further, there exists a cell A with CCs of frequency f3. It is assumed that, at first, the cell A does not constitute CA related to dual connectivity.

The UE 50, which has received measurement configuration information of an event A4 (in which frequency f3 is specified in a measurement object), reports information of the cell A to the MeNB 10 because reception quality of the cell A of frequency f3 has become better than the threshold value. The MeNB 10 determines to add the cell A as the SCell of the SCG, and performs an addition process including transmitting an instruction to the SeNB 20, etc.

<Event A6: Neighbor Becomes Offset-scg Better (SCG) SCell>

The event A6 is used for transmitting a report in the case where reception quality of a neighbor cell with the same frequency as the SCell becomes better than the reception quality of the SCell by a predetermined offset amount. In an embodiment, the offset is determined by the SeNB 20, and transmitted to the MeNB 10 as an offset for the event A6 (offset-scg). The MeNB 10 transmits to the UE 50 measurement configuration information including the offset, a measurement target frequency, and an event A6 as a trigger type. The measurement target frequency may be determined by the MeNB 10, or may be transmitted from the SeNB 20 to the MeNB 10 as a parameter together with the offset.

Figure 11:
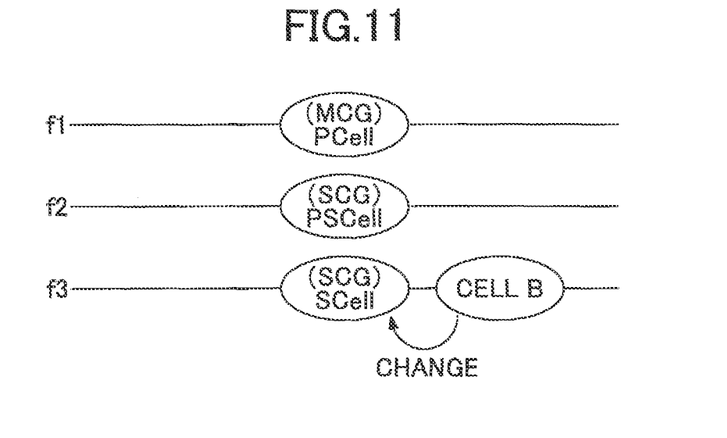
FIG. 11 is a drawing illustrating an event A6 according to an embodiment.

Referring to FIG. 11, an application example of the event A6 will be described. As illustrated in FIG. 11, CCs of frequency f1 constitute a PCell of a MCG, CCs of frequency f2 constitute a PSCell of a SCG, and dual connectivity is performed. Further, there exists a cell B with CCs of frequency f3. It is assumed that, at first, the cell B does not constitute CA related to dual connectivity.

The UE 50, which has received measurement configuration information of an event A6 (in which frequency f3 is specified in a measurement object), reports information of the cell B to the MeNB 10 because reception quality of the cell B of frequency f3 has become better than the reception quality of the SCell (frequency f3) by an offset amount. The MeNB 10 determines to use as the SCell the cell B instead of the existing SCell, and performs a change process including transmitting an instruction to the SeNB 20, etc.

(New Event: An Example in which "Neighbor Becomes Offset-scg Better than PSCell" is Used)

Next, an example will be described in which an event similar to the existing event A3 is defined as a new event and used.

The existing event A3 is used for transmitting a report in the case where reception quality of a neighbor cell becomes better than reception quality of the PCell by more than an offset amount. However, because "PCell" is used in the definition, the existing event A3 cannot be used for a measurement event related to PSCell formed by the SeNB 20.

Therefore, in an embodiment, a new event ("Neighbor becomes offset-scg better than PSCell") will be introduced which is used for transmitting a report in the case where reception quality of a neighbor cell becomes better than the reception quality of the PSCell by more than an offset amount.

In an embodiment, the offset is determined by the SeNB 20, and transmitted to the MeNB 10 as an offset for the new event (offset-scg). The MeNB 10 transmits to the UE 50 measurement configuration information including the offset, a measurement target frequency, and the "new event" as a trigger type. The measurement target frequency may be determined by the MeNB 10, or may be transmitted from the SeNB 20 to the MeNB 10 as a parameter together with the offset.

Figure 12:
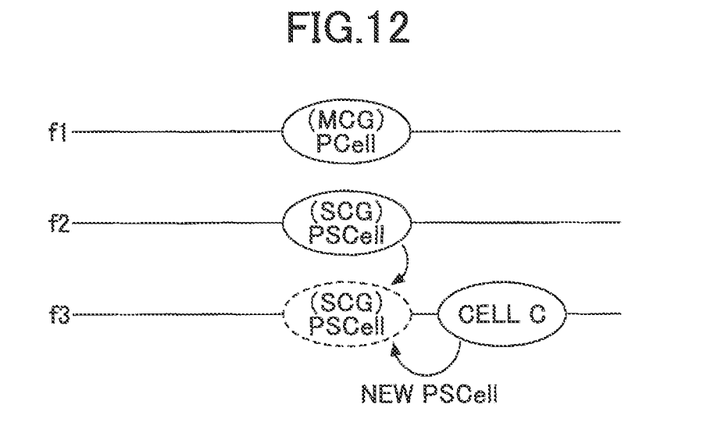
FIG. 12 is a drawing illustrating a new event according to an embodiment.

Referring to FIG. 12, an application example of the new event will be described. As illustrated in FIG. 12, CCs of frequency f1 constitute a PCell of an MCG, CCs of frequency f2 constitute a PSCell of an SCG, and dual connectivity is performed. Further, there exists a cell C with CCs of frequency f3. It is assumed that, at first, the cell C does not constitute CA related to dual connectivity.

The UE 50, which has received measurement configuration information of the new event (in which frequency f3 is specified in a measurement object), reports information of the cell C to the MeNB 10 because reception quality of the cell C of frequency f3 has become better than the reception quality of the PSCell by an offset amount. The MeNB 10 determines to use as the PSCell the cell C instead of the existing PSCell, and performs a change process (handover in the SCG) including transmitting an instruction to the SeNB 20, etc.

(Another Processing Sequence Example)

Figure 13:
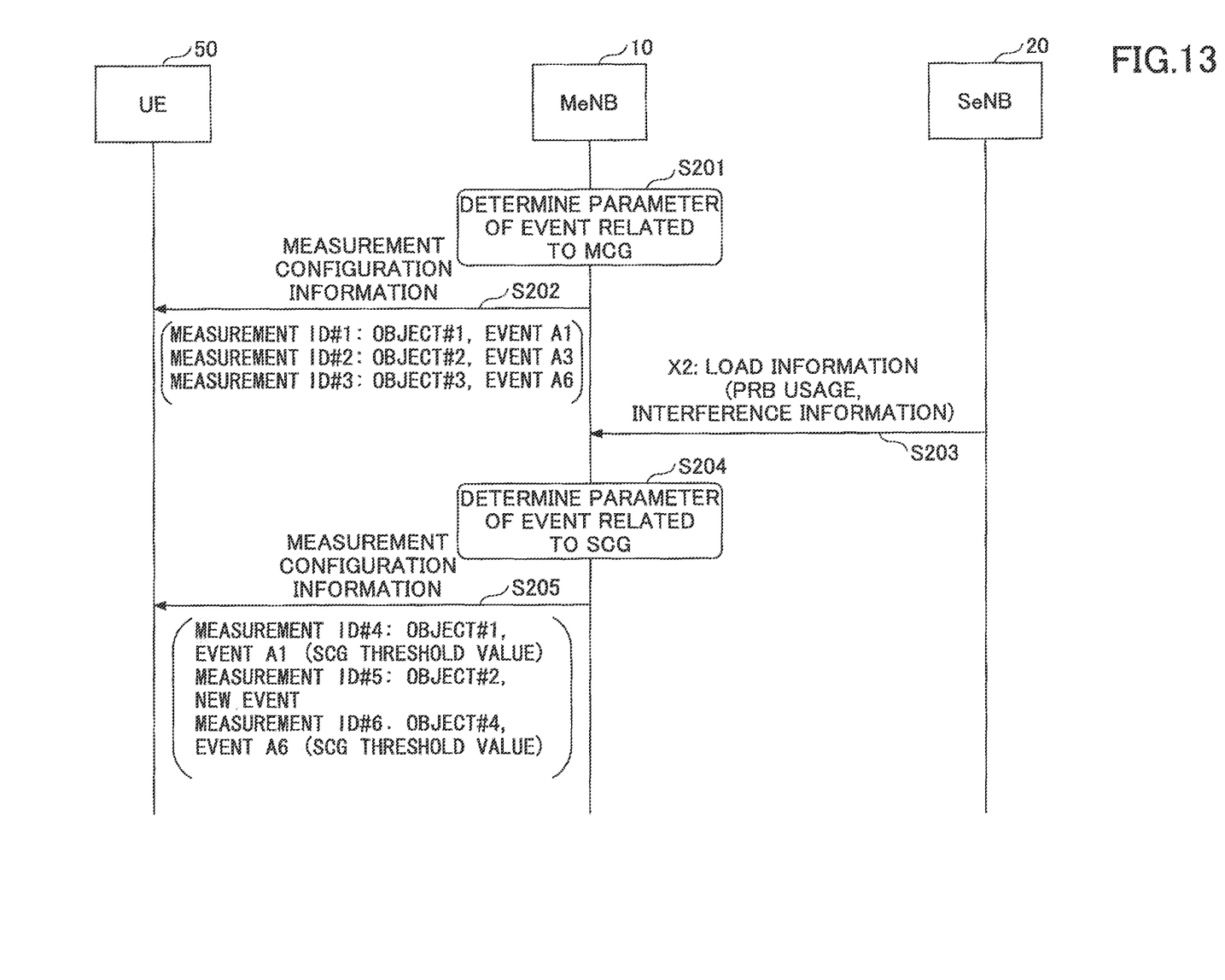
FIG. 13 is a drawing illustrating another processing sequence example of a communication system.

In the above, an example has been described in which the SeNB 20 determines parameters related to the SCG and transmits the parameters to the MeNB 10. However, there may be a case in which the MeNB 10 determines the parameters related to the SCG by having information necessary for determining the parameters related to the SCG transmitted from the SeNB 20 to the MeNB 10. A processing sequence example in the above case is illustrated in FIG. 13. In the case of FIG. 13, a parameter determination method, event contents, contents of measurement configuration information, etc. are the same as those described above.

In an example of FIG. 13, step S201 and step S202 are the same as step S101 and step S102 illustrated in FIG. 7, respectively.

In step S203, load information (e.g., PRB usage, interference information) in cells of the SCG necessary for determining the parameters is transmitted from the SeNB 20 to the MeNB 10 via X2 interface. The MeNB 10 determines the parameters used for the event to be applied to the UE 50 based on the received load information (step S204), and transmits measurement configuration information in which the parameters are set to the UE 50 (step S205).

It should be noted that there may be a case in which the MeNB 10 determines the parameters related to the SCG without receiving the load information, etc., from the SeNB 20, and generates the measurement configuration information in which the parameters are set. In such a case, for example, predefined values may be used as the parameters related to the SCG.

(Apparatus Configuration)

Figure 14:
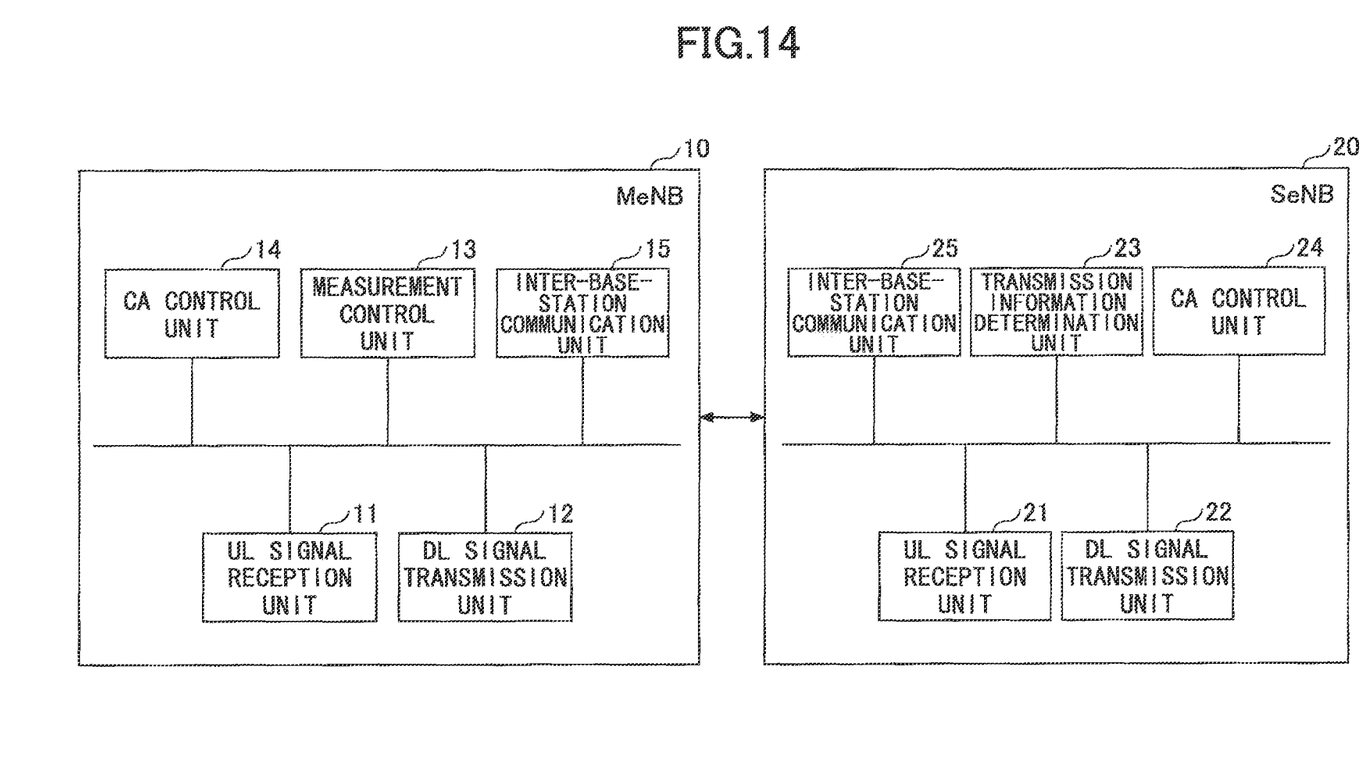
FIG. 14 is a functional structure diagram of a MeNB 10 and a SeNB 20.

FIG. 14 illustrates a functional configuration diagram of the MeNB 10 and the SeNB 20 according to an embodiment. As illustrated in FIG. 14, the MeNB 10 includes a UL signal reception unit 11, a DL signal transmission unit 12, a measurement control unit 13, a CA control unit 14, and an inter-base-station communication unit 15.

The UL signal reception unit 11 receives a signal from the UE 50, and the DL signal transmission unit 12 transmits a signal to the UE 50. The measurement control unit 13 has a function for determining parameters related to the MCG, generating measurement control information related to the MCG, and transmitting the generated measurement control information from the DL signal transmission unit 12; and, at the same time, by using information received from the SeNB 20 (parameters including a threshold value, an offset, etc., related events, etc.,) generating measurement control information related to the SCG, and transmitting the generated measurement control information from the DL signal transmission unit 12. Further, the measurement control unit 13 may have a function for receiving from the SeNB 20 load information necessary for determining the parameters related to the SCG, determining the parameters related to the SCG by using the load information, generating the measurement control information related to the SCG, and transmitting the generated measurement control information from the DL signal transmission unit 12. It should be noted that, as described above, it is not required to use the load information. Further, the measurement control unit 13 also has a function for receiving a measurement report from the UE 50 and transmitting the received measurement report to the CA control unit 14.

The CA control unit 14 performs cell addition, removal, change, management, etc., related to the MCG and the SCG based on the measurement report, etc., and performs operations with the SeNB 20 necessary for dual connectivity. The inter-base-station communication unit 15 performs communications with the SeNB 20 by using X2 interface.

As illustrated in FIG. 14, the SeNB 20 includes a UL signal reception unit 21, a DL signal transmission unit 22, a transmission information determination unit 23, a CA control unit 24, and an inter-base-station communication unit 25.

The UL signal reception unit 21 receives a signal from the UE 50, and the DL signal transmission unit 22 transmits a signal to the UE 50. The transmission information determination unit 23 has a function for determining information used for measurement control related to the SCG (parameters including a threshold value, an offset, etc., related events, etc.,) and transmitting the determined information to the MeNB 10. Regarding the parameters including a threshold value, an offset, etc., predefined values, for example, may be used, or, as described above, the parameters may be determined based on cell load information, etc. In the case where the predefined values are used, for example, parameters for corresponding events are stored in a storage unit, the parameters corresponding to an event which is used are selected (determined), and read from the storage unit.

Further, the transmission information determination unit 23 may have a function for obtaining (determining) load information necessary for determining parameters of the event related to the SCG, and transmitting the load information to the MeNB 10.

The CA control unit 24 performs cell addition, removal, change, management, etc., related to the SCG based on an instruction from the MeNB 10, and performs operations with the MeNB 10 necessary for dual connectivity. The inter-base-station communication unit 25 performs communications with the MeNB 10 by using X2 interface.

Based on the configuration illustrated in FIG. 14, operations corresponding to step S103 through step S105 of the sequence illustrated in FIG. 7 will be described.

The SeNB 20 constitutes the SCG (multiple cells with which CA is provided) according to the CA control unit 24. According to a predetermined trigger (e.g., periodical, quality of a cell including CQI), the transmission information determination unit 23 of the SeNB 20 determines information (parameters including a threshold value, an offset, etc., related events, etc.,) for measurement control related to the SCG which should be performed according to the trigger, and transmits the determined information to the MeNB 10 via the inter-base-station communication unit 25. It should be noted that the information may be referred to as a measurement instruction because measurement configuration information is generated and transmitted based on the information.

The measurement control unit 13 in the MeNB 10, which has received the information via the inter-base-station communication unit 15, generates one or more measurement configuration information items (including a measurement object, measurement reporting information, and a measurement ID) corresponding to an event included in the received information, and transmits to the UE 50 the generated information as an RRC message via the DL signal transmission unit 12.

Next, based on the configuration illustrated in FIG. 14, operations corresponding to step S203 through step S205 of the sequence illustrated in FIG. 13 will be described.

The SeNB 20 constitutes the SCG (multiple cells with which CA is configured) according to the CA control unit 24. According to a predetermined trigger, the transmission information determination unit 23 of the SeNB 20 obtains load information necessary for determining parameters for measurement control related to the SCG which should be performed according to the trigger, and transmits the load information to the MeNB 10 via the inter-base-station communication unit 25.

The measurement control unit 13 in the MeNB 10, which has received the load information via the inter-base-station communication unit 15, determines parameters related to an event to be applied to the UE 50 based on the received load information, generates one or more measurement configuration information items (including a measurement object, measurement reporting information, and a measurement ID), and transmits to the UE 50 the generated information as an RRC message via the DL signal transmission unit 12.

It should be noted that, in FIG. 14, the MeNB 10 and the SeNB 20 are illustrated as base stations with different configurations. However, a base station which includes functions of the MeNB 10 and the SeNB 20 may be provided. Such a base station may be used as a MeNB 10, or may be used as a SeNB 20.

The base station according to an embodiment may include a CPU and a memory, may be realized by having a program executed by the CPU (processor), may be realized by hardware such as hardware circuitry in which the logic described in an embodiment is included, or may be realized by a mixture of a program and hardware.

As described above, in an embodiment, a measurement control method in a mobile communication system is provided. The mobile communication system includes a first base station and a second base station which perform communications with a user apparatus by using inter-base-station carrier aggregation. The measurement control method includes a measurement instruction step of determining, by the second base station, parameters used for measurement configuration information for the user apparatus and transmitting the measurement instruction information including the parameters to the first base station; and a measurement configuration information setting step of generating, by the first base station which has received the measurement instruction information, measurement configuration information in which parameters included in the measurement instruction information are set, and transmitting the measurement configuration information to the user apparatus.

With the above arrangement, for example, it is possible for the second base station as the SeNB to determine parameters related to the SCG, and to transmit to a user apparatus measurement configuration information in which the parameters are set, and thus, it is possible to appropriately provide measurement configuration information for the user apparatus in a mobile communication system which includes the first base station and the second base station which perform communications with the user apparatus by using inter-base-station carrier aggregation In the measurement instruction step, the measurement instruction information transmitted to the first base station includes an event type related to the parameters. With the above arrangement, it is possible for the first base station to easily set the parameters corresponding to a specific event in the measurement configuration information, and to transmit the measurement configuration information.

The parameters are, for example, a threshold value or an offset corresponding to the event type. The threshold value or the offset is a parameter frequently used in an event defined in LTE or in a new event. With the above arrangement, the threshold value or the offset can be set for the user apparatus appropriately.

The measurement configuration information is used for, for example, performing radio measurement related to a cell under the second base station or a neighbor cell. The parameters are related to the cell under the second base station or the neighbor cell. The neighbor cell is, but not limited to, a cell neighbor to the cell under the second base station. With the above arrangement, it is possible to transmit from the first base station measurement configuration information including parameters related to a cell formed by the second base station, and it is possible to provide measurement configuration information appropriately by taking into account a measurement condition difference between the MCG and the SCG.

Further, according to an embodiment, a measurement control method in a mobile communication system is provided. The mobile communication system includes a first base station and a second base station which perform communications with a user apparatus by using inter-base-station carrier aggregation. The measurement control method includes a parameter determination step of determining, by the first base station, parameters used for radio measurement related to a cell under the second base station or a neighbor cell; and a measurement configuration information providing step of generating, by the first base station, measurement configuration information in which the parameters are set, and transmitting the measurement configuration information to the user apparatus. With the above arrangement, it is possible to provide measurement configuration information for the user apparatus appropriately in a mobile communication system including a first base station and a second base station which base stations communicate with a user apparatus by using inter-base-station carrier aggregation.

In the above measurement control method, a transmission step of transmitting, by the second base station, information used for determining the parameters to the first base station may be included, and in the parameter determination step, the first base station may determine the parameters based on the information received from the second base station. With the above arrangement, it is possible for the first base station to set the parameters more appropriately by taking into account a state of a cell in the second base station.

Further, in the measurement configuration information providing step, the measurement configuration information generated by the first base station may include a measurement object for specifying a measurement target, reporting configuration information for specifying a reporting method, and a measurement ID which links the measurement object with the reporting configuration information. As described above, by using the measurement ID which links the measurement object with the reporting configuration information, it is possible to clearly identify reporting configuration information items according to the measurement ID even in the case where the same measurement object (frequency, etc.,) is used for different reporting configuration information items (different events, etc.)

Further, it is possible for the first base station to generate measurement configuration information in which parameters related to cells formed by the first base station are set, and in which a measurement ID different from the above measurement ID is included, and to transmit the measurement configuration information to the user apparatus. As described above, by generating the measurement configuration information which includes a measurement ID different from the above measurement ID, it is possible for a base station which receives a measurement report including the measurement IDs to determine, for example, whether the report is related to the MCG or related to the SCG based on the measurement IDs.

As described above, embodiments have been described. The disclosed invention is not limited to these embodiments, and a person skilled in the art would understand various variations, modifications, replacements, or the like. Specific examples of numerical values have been used for encouraging understanding of the present invention. These numeric values are merely examples and, unless otherwise noted, any appropriate values may be used. In the above description, partitioning of items is not essential to the present invention. Matters described in more than two items may be combined if necessary. Matters described in one item may be applied to matters described in another item (as long as they do not conflict). In a functional block diagram, boundaries of functional units or processing units do not necessarily correspond to physical boundaries of parts. Operations of multiple functional units may be physically performed in a single part, or operations of a single functional unit may be physically performed by multiple parts. For the sake of description convenience, the base station has been described using functional block diagrams, and such an apparatus may be implemented by hardware, by software, or by combination of both. The software which is executed by a processor included in a base station may be stored in a random access memory (RAM), a flash memory, a read-only memory (ROM), an EPROM, an EEPROM, a register, a hard disk drive (HDD), a removable disk, a CD-ROM, a database, a server, or any other appropriate recording medium. The present invention is not limited to the above embodiments and various variations, modifications, alternatives, replacements, etc., may be included in the present invention without departing from the spirit of the invention.

The present PCT application is based on and claims the benefit of priority of Japanese Priority Application No. 2014-080585 filed on Apr. 9, 2014, the entire contents of which are hereby incorporated by reference.

DESCRIPTION OF THE REFERENCE NUMERALS

MeNB, SeNB base station
UE user apparatus
11 UL signal reception unit
12 DL signal transmission unit
13 Measurement control unit
14 CA control unit
15 Inter-base-station communication unit
21 UL signal reception unit
22 DL signal transmission unit
23 Transmission information determination unit
24 CA control unit
25 Inter-base-station communication unit

What is claimed is:

1. A measurement control method in a mobile communication system including a first base station and a second base station which base stations communicate with a user apparatus, the measurement control method comprising:
by the second base station:
determining a parameter used for measurement configuration for the user apparatus, and
transmitting measurement instruction information including the parameter to the first base station; and
by the first base station that has received the measurement instruction information:
transmitting measurement configuration information in which the parameter included in the measurement instruction information is set to the user apparatus,
wherein:
the first base station and the second base station communicate with the user apparatus using dual connectivity,
the parameter is a threshold value or an offset,
the measurement configuration information includes a measurement ID by which a measurement object specifying a measurement target is associated with reporting configuration information specifying a reporting method,
the measurement configuration information is transmitted by the first base station,
the reporting method is specified by the reporting configuration information that includes a reporting trigger, and
the measurement configuration information further includes an event A3 related to measurement of a PSCell.

2. The measurement control method according to claim 1, wherein the measurement instruction information transmitted to the first base station includes an event type related to the parameter.

3. The measurement control method according to claim 2, wherein the parameter is a threshold value or an offset corresponding to the event type.

4. The measurement control method according to claim 1, wherein the measurement configuration information is used for radio measurement related to a cell under the second base station or a neighbor cell, and the parameter is related to the cell under the second base station or the neighbor cell.

5. A measurement control method in a mobile communication system including a first base station and a second base station which base stations communicate with a user apparatus, the measurement control method comprising:
by the first base station:
determining a parameter for radio measurement related to a cell under the second base station or a neighbor cell, and
transmitting measurement configuration information in which the parameter is set to the user apparatus,
wherein:
the first base station and the second base station communicate with the user apparatus using dual connectivity,
the parameter is a threshold value or an offset,
the measurement configuration information includes a measurement ID by which a measurement object specifying a measurement target is associated with reporting configuration information specifying a reporting method,
the measurement configuration information is transmitted by the first base station,
the reporting method is specified by the reporting configuration information that includes a reporting trigger, and
the measurement configuration information further includes an event A3 related to measurement of a PSCell.

6. The measurement control method according to claim 5, further comprising:
by the second base station, transmitting information used for determining the parameter to the first base station, wherein
the first base station determines the parameter by using the information received from the second base station.

7. The measurement control method according to claim 4, wherein the first base station transmits measurement configuration information in which the parameter related to the cell under the first base station is set, and in which a measurement ID different from the measurement ID is included, and transmits the measurement configuration information to the user apparatus.

8. The measurement control method according to claim 2, wherein the measurement configuration information is used for radio measurement related to a cell under the second base station or a neighbor cell, and the parameter is related to the cell under the second base station or the neighbor cell.

9. The measurement control method according to claim 3, wherein the measurement configuration information is used for radio measurement related to a cell under the second base station or a neighbor cell, and the parameter is related to the cell under the second base station or the neighbor cell.

10. The measurement control method according to claim 1, wherein the measurement configuration information includes the measurement object specifying the measurement target, the reporting configuration information specifying the reporting method, and the measurement ID.

11. The measurement control method according to claim 1, wherein the reporting method is specified by the reporting configuration information that includes a measurement quantity.

12. A base station corresponding to a first base station in a mobile communication system including the first base station and a second base station which base stations communicate with a user apparatus, the base station comprising:
   a receiver that receives from the second base station measurement instruction information which includes a parameter used for measurement configuration for the user apparatus;
   a transmitter configured to transmit measurement configuration information in which the parameter included in the measurement instruction information is set to the user apparatus,
   wherein:
      the first base station and the second base station communicate with the user apparatus using dual connectivity,
      the parameter is a threshold value or an offset,
      the measurement configuration information includes a measurement ID by which a measurement object specifying a measurement target is associated with reporting configuration information specifying a reporting method,
      the measurement configuration information is transmitted by the first base station,
      the reporting method is specified by the reporting configuration information that includes a reporting trigger, and
      the measurement configuration information further includes an event A3 related to measurement of a PSCell.

13. A base station corresponding to a first base station in a mobile communication system including the first base station and a second base station which base stations communicate with a user apparatus, the base station comprising:
   a processor configured to determine a parameter for radio measurement related to a cell under the second base station or a neighbor cell; and
   a transmitter that transmits measurement configuration information in which the parameter is set to the user apparatus,
   wherein:
      the first base station and the second base station communicate with the user apparatus using dual connectivity,
      the parameter is a threshold value or an offset,
      the measurement configuration information includes a measurement ID by which a measurement object specifying a measurement target is associated with reporting configuration information specifying a reporting method,
      the measurement configuration information is transmitted by the first base station,
      the reporting method is specified by the reporting configuration information that includes a reporting trigger, and
      the measurement configuration information further includes an event A3 related to measurement of a PSCell.

* * * * *